No. 734,822. PATENTED JULY 28, 1903.
H. W. COOLEY.
PAWL AND RATCHET DEVICE.
APPLICATION FILED FEB. 20, 1903.
NO MODEL. 2 SHEETS—SHEET 2.
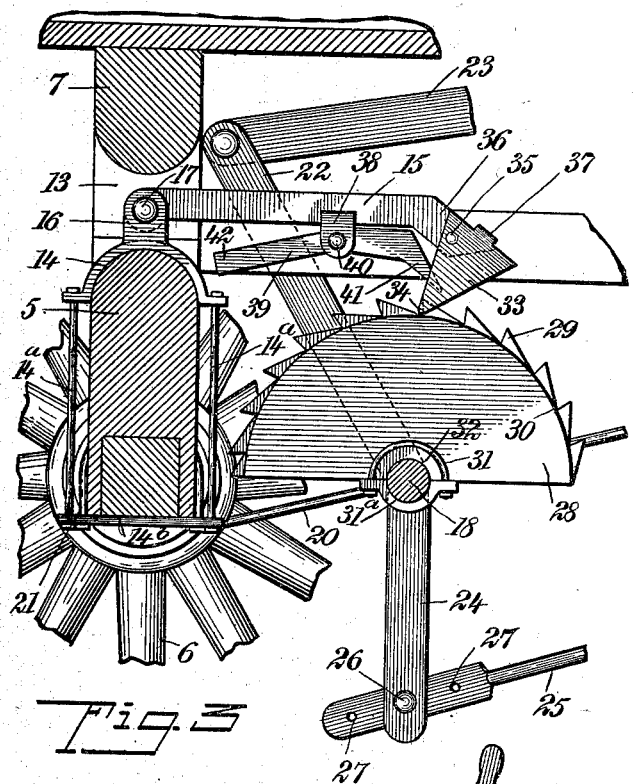
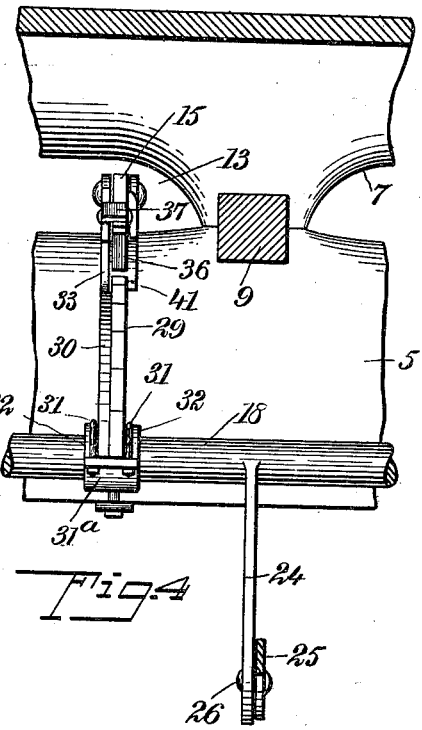
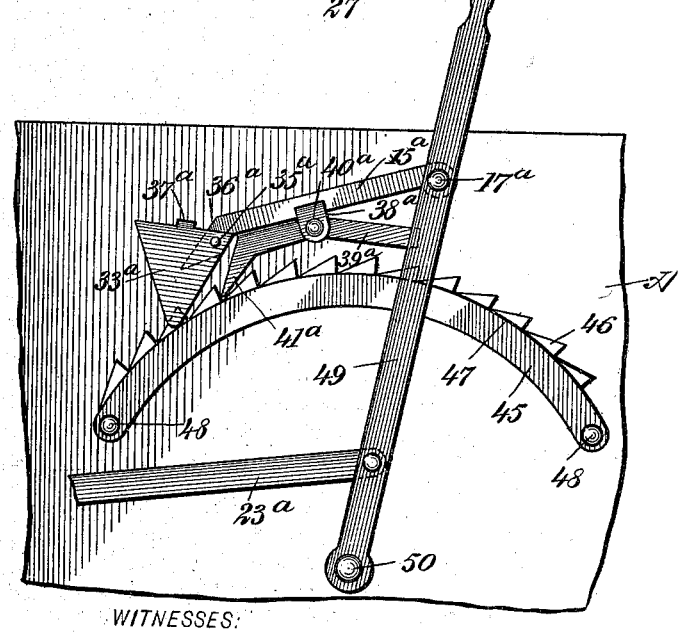
WITNESSES:
INVENTOR
Harry W. Cooley
BY
ATTORNEYS.

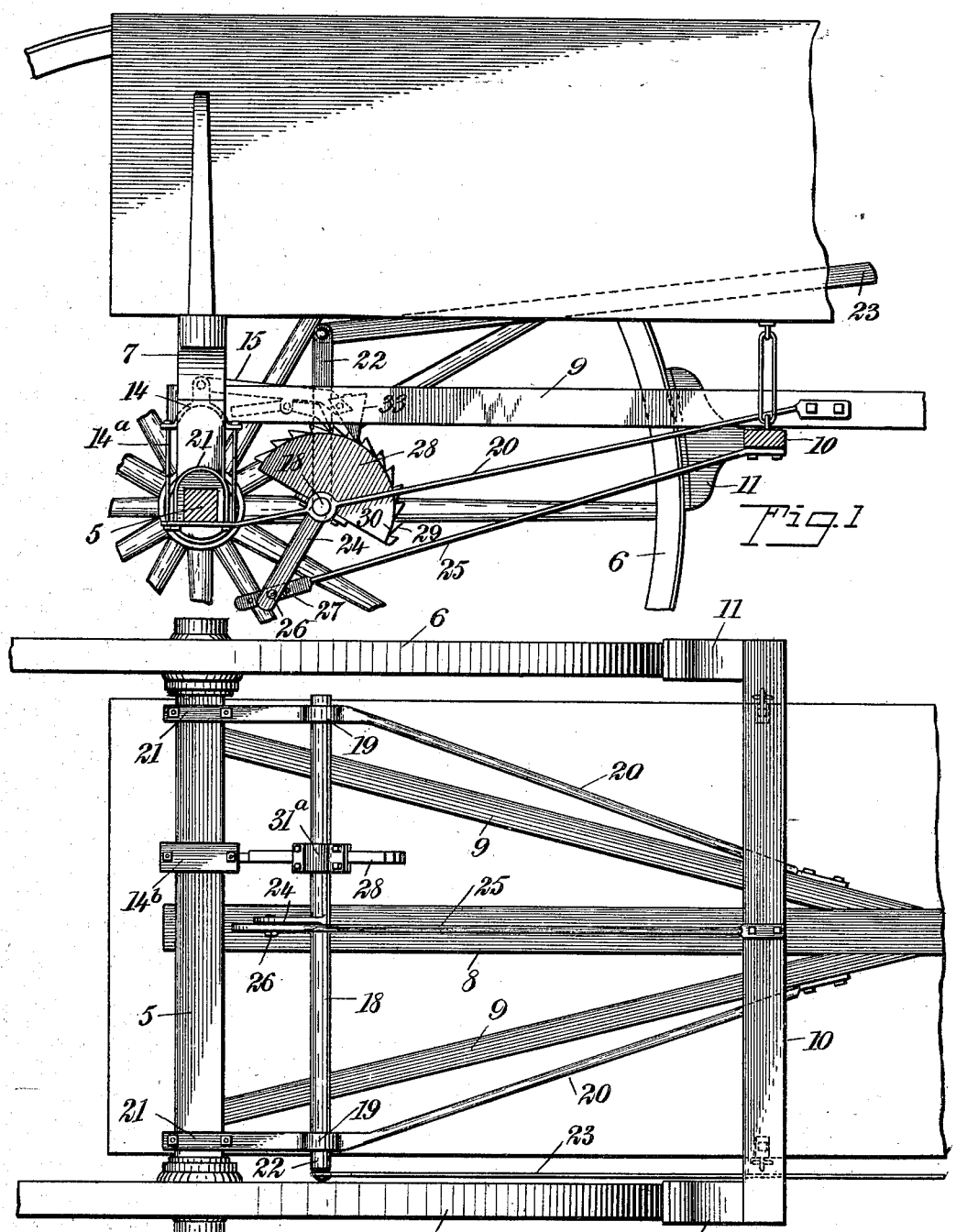

No. 734,822.

Patented July 28, 1903.

UNITED STATES PATENT OFFICE.

HARRY WALTER COOLEY, OF LONEROCK, OREGON, ASSIGNOR OF ONE-HALF TO GEORGE A. BERRY, OF GLEN, OREGON.

PAWL-AND-RATCHET DEVICE.

SPECIFICATION forming part of Letters Patent No. 734,822, dated July 28, 1903.

Application filed February 20, 1903. Serial No. 144,178. (No model.)

*To all whom it may concern:*

Be it known that I, HARRY WALTER COOLEY, a citizen of the United States, and a resident of Lonerock, in the county of Gilliam and State of Oregon, have invented a new and Improved Pawl-and-Ratchet Device, of which the following is a full, clear, and exact description.

This invention relates to pawl-and-ratchet devices for holding or locking mechanical contrivances, such as the brakes of vehicles, although it may be used in other relations.

One purpose of this invention is to provide simple and effective means for locking a part, such as a brake-shoe, in an applied position and for releasing the locking device by a pull exerted in the same direction as the pull required to apply or set the part.

Another object that I have in view is to provide means for applying the device to a running-gear of a vehicle, thus making the device capable of use in connection with vehicles which may or may not be equipped with a body or box.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a view in side elevation, partly in section, of my pawl-and-ratchet device applied to a farm-vehicle and operatively connected with a part of the brake mechanism. Fig. 2 is an inverted or bottom plan view of the structure shown by Fig. 1. Fig. 3 is an enlarged view in side elevation, partly in section, of my pawl-and-ratchet device, illustrating the different positions of the parts from that shown by Fig. 1. Fig. 4 is a view in elevation at right angles to Fig. 3, showing certain parts of the vehicle in elevation and in section; and Fig. 5 is a side elevation of another embodiment of the pawl-and-ratchet device, the same being especially adapted for use in connection with a brake-lever and on the body of a vehicle.

I will first proceed to describe the construction represented by Figs. 1 to 4, inclusive, wherein 5 designates a portion of a vehicle-axle; 6, the wheels thereof; 7, a bolster; 8, the coupling-pole, and 9 the hounds. These parts may be of the usual or any preferred construction. In connection with the vehicle I have shown a brake mechanism which contemplates the employment of a brake-beam 10, equipped with the brake-shoes 11, the latter being arranged to engage with the rims of the wheels 6 in the usual way. The brake-beam may be supported on the running-gear of the vehicle or on the body, and said brake mechanism may be of the usual or any preferred type. As shown by Fig. 4, the axle 5 and the bolster 7 are recessed to provide spaces through which the coupling-pole and the hounds are adapted to pass, and one of these recesses—as, for example, the recess 13—accommodates a part of the improved pawl-and-ratchet device which forms the subject-matter of this application. The part or element just referred to as occupying the recess 13 is a clip adapted to support a lever 15. In the form of the clip shown by the drawings it consists of a yoke 14, having the rods $14^a$, engaging with a clip-plate $14^b$. This yoke straddles the axle 5, and to the end portions of the yoke are fastened the upper ends of the rods $14^a$, the lower ends of which are attached to the clip-plate $14^b$, which extends across the under side of the axle. (See Fig. 4.) The yoke 14 is provided with an upstanding lug 16, to which is pivoted the rear end of the lever 15 by means of a pin or bolt 17. 18 designates a rock-shaft arranged in a horizontal position below the running-gear and transversely of the vehicle, said rock-shaft being journaled in suitable bearings 19, which, as shown, are formed or provided on stay-rods 20, the front ends of said stay-rods being secured to the running-gear—as, for example, to the hounds 9—while the rear ends of the rods are fastened by clips 21 to the axle. These stay-rods diverge rearwardly from the hounds to the axle and they are inclined downwardly below the horizontal plane of the running-gear. The rock-shaft 18 is provided with an upstanding arm or crank 22, to which may be connected a suitable operating device—such, for example, as the pitman 23—or in lieu of this pitman I may employ a rope or cable of any equivalent device, said pitman or cable extending from the crank-arm 22 to a suitable operating device, such as a lever, provided at the front part of the vehicle within convenient reach of the driver. The rock-shaft is furthermore provided with a depending crank-arm 24, to the lower end of which is pivotally connected a brake-rod 25 by means of a bolt 26, the latter adapted to be placed in either one of a series of apertures 27, which are provided in the brake-rod 25, thus making provision for adjustably connecting said crank-arm of the rock-shaft with the brake-rod. Said brake-rod extends forwardly and upwardly from the rock-shaft arm 24 to the brake-beam 10, whereby the rock-shaft is operatively connected with the brake-beam to impart movement thereto when said shaft is turned.

One of the important features of my invention is a segmental rack 28, which is made fast with the rock-shaft 18 in any suitable way, thus making the rack turn or rock with said shaft. As shown by Figs. 1 to 4, inclusive, this segmental rack is in the form of a semicircular plate provided with a series of ratchet-teeth 29 and a ledge or shoulder 30; but I would have it understood that the form and dimensions of the rack are not material, because I may employ a part which is similar to a full circular disk or which resembles a quadrant. The rack 28 is fitted on the rock-shaft 18 at a point directly below the lever 15, which is hung on the clip attached to the axle, and this rack is secured firmly to the shaft by means of the clamps 31. Each clamp has a yoke-shaped bolt which embraces a hub-flange 32, forming a part of the rack, and the end portions of this bolt are secured to the clamping-plate 31ᵃ, fitting below the rock-shaft, whereby the two-part clamp embraces said shaft and makes the rack 28 fast therewith. The shoulder 30 of the rack is concentric with the axis of the shaft 18 and with the bases of the segmental row of ratchet-teeth 29. These ratchet-teeth extend a suitable distance from the peripheral edge of the rack, and they are disposed in a vertical plane at one side of the shoulder 30, thus exposing the segmental face of said shoulder for engagement by a shoe 33, which is carried by the free or unconfined end of the lever 15. The shoe 33 is represented as a triangular plate; but the shape of the shoe is not material, and any form of plate having a bearing-point or edge 34 may be employed, said bearing-point being adapted to rest on the segmental shoulder 30 of the rack. This shoe is connected pivotally by a pin 35 to an angular end 36 of the lever 15, and the shoe is also provided with an offstanding lip or shoulder 37, the latter being adapted in one position of the shoe to impinge or bear against said angular end 36 of the lever and limit the pivotal adjustment of the shoe with respect to the lever for a purpose which will hereinafter appear. The lever 15 is also provided with a clip or a pair of ears 38, and in the space provided by said ears or clip is arranged a pawl-lever 39, the latter being hung or pivoted by a bolt 40 to the ears or clip, so that said pawl-lever will be mounted directly on and movable with the lever 15. This pawl-lever is formed with an inclined beak 41, which is adapted to engage with one or the other of the teeth 29 on the rack; but the other end of the pawl-lever terminates in a heavy or counterweighted arm 42, said arm serving to counterweight the nose of the pawl-lever and under certain conditions to lift said nose free from engagement with the teeth of the rack.

In operation and assuming that the parts are in the position shown by Fig. 3 strain in a forward direction is exerted on the pitman 23 or its equivalent. The arm 22 is drawn in a forward direction to rock the shaft 18, and the arm 24 is moved rearwardly, thus pulling on the brake-rod 25 and moving the beam 10 in a backward direction, so as to apply the shoes 11 against the wheels. The movement of the rock-shaft 18 when the arm 22 is thrown forward turns the segmental rack 28 to the position shown by Fig. 1, and this movement of the rack carries the shoe 33 forwardly and allows the lever 15 and the arm 42 of the pawl-lever to move downwardly toward said rack 28, the lever 15 swinging on the axis aforesaid by the bolt or pin 17. By the time that the brake-shoes shall have been applied the pivoted shoe 33 is carried forward a sufficient distance for the levers 15 and 39 to move downwardly, so that the nose 41 of the pawl is in engagement with one of the teeth 29 of the rack, thereby locking the rack in its adjusted position and holding the brake-shoes applied forcibly against the wheels. In the applied position of the parts represented by Fig. 1 the pivot 40 of the pawl-lever is at a point above a line drawn from the point of the pawl-nose 41 and the center of the bolt or pin 17. When this pawl-lever, together with the lever 15, sustains the pressure or strain due to the application of the brake-shoes, the angular end 36 of the lever 15 is caused to rise until it is checked by the weighted end 42 of the pawl-lever 39 coming in contact with the lower surface of the lever 15 and the nose of the pawl is still in the notch of the rack. This operation allows the shoe 33 to swing back until the lip 37 rests on the angular end of the lever 15, and the lower point of the shoe 33 rests on the shoulder of the rack 28. The pawl-and-ratchet device thus operates in an efficient manner to keep the brake-shoes applied, and when it is desired to release the brake-shoes the operator is not required to push in a backward direction, as in ordinary brake devices. The release of the brake-shoes is effected by exerting strain on the pitman 23 or the cable in the same direction as when the brake-shoes are initially applied, and when this extra strain is exerted on said pitman or cable the parts act in the following way: The continued application of the extra strain has a tendency to turn the rock-shaft and the rack a limited distance in a forward direction, such movement of the rack being sufficient for the nose of the pawl-lever to free itself from engagement with the ratchet-teeth, whereupon the counterweighted end 42 of the pawl-lever lifts the nose a sufficient distance to clear the path of the teeth 29 on the rack. The rack is now free to turn with the shaft in a backward direction.

The described construction and arrangement of parts comprising the pawl-and-ratchet device shown by Figs. 1 to 4, inclusive, is especially useful on vehicles which may or may not be equipped with a wagon body or box, because such devices are not attached in any way to the box or body, but, on the contrary, they are associated with certain parts of the vehicle running-gear. In Fig. 5 of the drawings, however, I have shown an embodiment of the invention which may be used advantageously in connection with a stationary rack and lever, said parts being attached to or mounted on a body or box A of the vehicle. In this form of the invention the rack is in the form of a segment, (indicated at 45,) said rack being equipped with a series of ratchet-teeth 46 and a shoulder 47. The rack may be fastened to the body A by studs or bolts 48, and said rack is traversed by a slotted lever 49, which is fulcrumed by a stud or bolt 50 to the body, said rack 45 being concentric with the center or axis of movement of the brake-lever. The lever has a pitman $23^a$, pivotally connected thereto and extending in a backward direction to a suitable brake mechanism. (Not shown.) A lever $15^a$ is connected pivotally and directly to the brake-lever 49 by a pin or bolt $17^a$, said lever $15^a$ being also equipped with ears $38^a$ and an angular end $36^a$. A pawl-lever $39^a$ is hung or pivoted at $40^a$ on the ears $38^a$ of said lever $15^a$, said pawl-lever having the nose $41^a$, adapted for engagement with the teeth 46 of the fixed rack 45. A shoe $33^a$ is pivoted by a pin or bolt $35^a$ to the angular arm of the lever $15^a$, and said shoe has a point arranged to engage with the shoulder 47 of the rack, and it is also equipped with a lip or shoulder $37^a$, which in one position of the shoe is adapted to ride against the angular end $36^a$ of said lever $15^a$.

The operation of the pawl-and-ratchet device shown by Fig. 5 is somewhat similar to that of the devices represented by Figs. 1 to 4, inclusive. In Fig. 5 the parts are represented in the positions which they assume when the brake-shoes are applied—that is to say, the lever 49 may be moved in a forward direction to exert strain on the pitman $23^a$—and this movement of the lever causes the shoe $33^a$ to turn on the pivot $35^a$ and allow the lever $15^a$ to drop for the nose of the pawl-lever to engage with one tooth of the rack 45. To release the brake, the operator presses in a forward direction on said lever 49 to impose the additional strain on the link $23^a$, thereby moving the levers $15^a$ $39^a$ forward a limited distance and allowing the nose $41^a$ of the pawl-lever to free itself from the teeth of the rack 45, the counterweighted end of the pawl-lever throwing said nose upward and out of the path of the ratchet-teeth 46. The brake-lever 49 may now move freely in a backward direction, because the shoe $33^a$, which rides on the shoulder 47 of the rack, lifts the lever $15^a$ and with it the pawl-lever a sufficient distance for the nose of said pawl-lever to lie well above the teeth 46 of said rack 45.

Although I have shown and described my improvements as adapted for use in connection with the brake mechanism of a vehicle, I would have it understood that the pawl-and-ratchet device may be used in other arts or in different relations.

Having thus described my invention, I claim as new and desire to secure by Letters Patent—

1. In a device of the class described, the combination of a rack having a shoulder, a lever hung adjacent to said rack, a shoe pivotally carried by said lever and having a single point of engagement with the shoulder of the rack, and a pawl pivotally carried by said lever; said shoe being capable of a limited swinging movement relative to the lever, and adapted in certain positions to raise the pawl from engagement with the rack.

2. In a device of the class described, the combination of a rack having a shoulder, and a series of teeth, a lever hung adjacent to the rack, a shoe pivoted to said lever and arranged to ride upon the shoulder of the rack, and a pawl carried directly by said lever and adapted under certain adjustments of the lever for engagement with the teeth of the rack, said pawl being counterpoised to normally throw the nose thereof away from the rack.

3. In a device of the class described, the combination of a toothed rack having a shoulder, a lever hung adjacent to said rack, a shoe pivoted to said lever and engaging with the shoulder of the rack, and a pawl pivoted directly to said lever for engagement with the teeth of the rack and having a counter-balanced end adapted to move the nose of said pawl automatically out of engagement with said teeth under certain adjustments of the lever.

4. In a device of the class described, the combination of a rack having a shoulder, a lever hung adjacent to said rack, a shoe pivoted to the lever for engagement with said shoulder and having a shoulder to impinge the lever and limit the movement of said shoe in one direction, and a pawl carried by the lever for engagement with said rack.

5. In a device of the class described, the combination of a rock-shaft, a rack fixed to said shaft to turn therewith and having a shoulder and a series of teeth, a lever hung adjacent to the rack, a shoe pivoted to said lever and having a single point of engagement with the shoulder of the rack, a pawl pivotally carried by said lever for engagement with the rack-teeth and counterpoised to free its nose from said rack under certain adjustments of the lever determined by said shoe, and means for rocking said shaft.

6. In a device of the class described, the combination of a rock-shaft, an arm extending in one direction from said shaft, another arm extending in another direction from the shaft and having connection with a device to be controlled, a toothed rack fast with said shaft and provided with a shoulder, a lever hung adjacent to the rack, a pawl carried by the lever for engagement with the teeth of the rack, and a shoe pivoted to said lever and engaging with the shoulder of the rack.

In testimony whereof I have signed my name to this specification in the presence of two subscribing witnesses.

HARRY WALTER COOLEY.

Witnesses:
 J. W. BURNS,
 SAM E. VAN VACTOR.